United States Patent Office 3,557,159
Patented Jan. 19, 1971

3,557,159
DINITRODIALKYL-p-BENZOQUINONES AND
DERIVATIVES THEREOF
Robert J. Gruber, Tonawanda Township, N.Y., assignor
to Hooker Chemical Corporation, Niagara Falls, N.Y.,
a corporation of New York
No Drawing. Filed Nov. 30, 1965, Ser. No. 510,679
Int. Cl. C07c 49/64, 45/16
U.S. Cl. 260—396                                    11 Claims

ABSTRACT OF THE DISCLOSURE

Compounds of the formulae

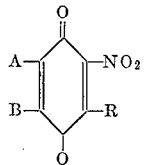 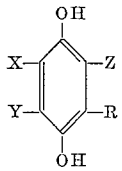

wherein R is alkyl; either A or B is alkyl, the other one being nitro; either X or Y is alkyl, the other one being selected from the group consisting of nitro, amino, and amino hydrohalide; and Z is selected from the group consisting of nitro, amino, and amino hydrohalide.

There are also provided processes for the production of the aforementioned compounds. In one of these a phenol of the formula

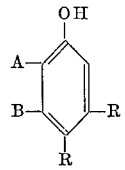

(where Y may be hydrogen, halogen, nitro, or a sulfo radical, R is alkyl, and either A or B is alkyl, the other one being hydrogen) is reacted with a nitrating agent to yield dinitro-dialkyl-p-benzoquinones. In the second of these the benzoquinones so produced are reduced to form the hydroquinones of this invention.

---

This invention relates to a novel class of dinitroquinone compounds and, in particular, to novel and useful dinitrodialkyl-p-benzoquinones and hydroquinone derivatives thereof.

A very large number of substituted quinones have been known to the art, many of these having been discovered in the 19th century. Amongst these, a few nitroquinones have been reported. However, the literature offers very little information regarding dinitro-p-benzoquinones with the exception, for example, of the atypical dienolic dinitroquinone which, by virtue of its atypical properties, has been called nitranilic acid (Nietzki et al., Chemische Berichte, 23 1217). The absence of simple dinitrobenzoquinones from the art may be accounted for by the observation of Hesse (Annalen 200, 244), Nietzki (Annalen 215, 138), and others who reported that in the treatment of unsubstituted p-benzoquinone with nitric acid (conditions that might have been expected to form a nitroquinone) only oxidative degradation products, such as oxalic and carbonic acids were formed. Thus, the teachings of the prior art would suggest the unfeasibility of producing simple dinitroquinones, by oxidative means.

It has now been found, unexpectedly, that dinitro-dialkyl-p-benzoquinones may be conveniently prepared by the action of a nitrating agent, such as nitric acid, on phenols of the structure

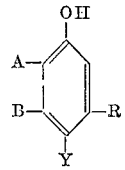

where Y may be hydrogen, halogen, nitro or sulfo radical, R is alkyl, and one of A and B is alkyl and the other hydrogen. When Y is a halogen it may be fluorine, chlorine, bromine or iodine. For economic reasons, chlorine is the preferred halogen.

The two alkyl substituents, the presence of which is essential, may be the same or different. A wide variety of alkyl substituents may be employed, and the word alkyl is meant to encompass linear, branched and cyclic alkyl radicals. Preferred alkyls are those having between 1 and about 20 carbon atoms, however, alkyls having more than 20 carbon atoms may be employed. Representative alkyl substituents include methyl, ethyl, n-propyl, isopropyl, n-butyl, sec-butyl, isobutyl, tert-butyl, amyl, hexyl, cyclohexyl, heptyl, octyl, cyclooctyl, nonyl, decyl, undecyl, dodecyl, tridecyl, tetradecyl, pentadecyl, hexadecyl, heptadecyl, octadecyl, nonadecyl, eicosyl, triacontyl, pentatriacontyl, and tetracontyl.

Typical phenols which may be employed as starting materials include, for example, 3,5-dimethylphenol, 3,5-dihexylphenol, 3,5-dioctylphenol, 2,5-dimethylphenol, 2,5-diheptylphenol, 4-chloro-3,5-diethylphenol, 4-nitro-3,5-dimethylphenol, 4-bromo-3,5-dimethylphenol, 4-sulfo-3,5-dipropylphenol, 4-fluoro-3,5-diethylphenol, 3-methyl-5-butylphenol, 2,6-dimethylphenol, 4-iodo-2,5-dimethylphenol, 2 - butyl-5-hexylphenol, 4-chloro-2-methyl-5-ethylphenol, 4-sulfo-2-ethyl-5-propylphenol, 4-bromo - 2,6 - didecylphenol, and the like.

The nitration of dialkylphenols to produce dinitrodialkyl-p-benzoquinones may be conveniently conducted in the liquid phase, preferably employing at least about 3 moles of nitric acid per mole of starting material. The nitric acid can be of concentration from about 20 percent to 100 percent and thus may encompass the article of commerce known as fuming nitric acid. When nitric acid toward the lower end of the indicated concentration range is employed, it is advantageous to add concentrated sulfuric acid in the manner analogous to that known in the art of nitrating organic compounds. Temperatures of from −20 degrees centigrade to the reflux temperature of the nitrating acid may be employed. Reaction times will obviously be dependent on the temperature and strength of the nitrating agent but will generally be in the range of 5 minutes to 24 hours.

The product will, in some cases, precipitate from solution and may then be isolated by filtration but usually, if more than a minimum of nitrating agent has been used, the product is partly or wholly in solution at the end of the reaction and may be caused to precipitate out by dilution of the reaction medium with water, whereupon the product may be recovered by filtration. Alternative means of isolation, such as, extraction with a water-immiscible organic solvent such as benzene, chlorobenzene, ether, chloroform, ethylene dichloride, nitrobenzene, or the like, may be employed also.

The novel dinitrodialkyl-p-benzoquinones of the present invention are characterized by the structural formula

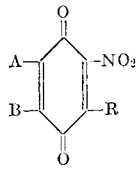

where R is alkyl carbon atoms, and one of A and B is alkyl, the other nitro. Typical alkyl groups are described hereinabove. The alkyl groups are preferably of from 1 to about 20 carbon atoms. The compounds are yellow solids (or in the case of the higher alkyls, oils) having not only the usual properties of p-benzoquinones but also certain exceptional properties which are not shared by the prior art quinones. The dinitro-p-benzoquinones of the invention possess substantial miticidal, nematocidal and insecticidal activities. In addition, they may be employed as colorants for textiles and the like.

Typical dinitrodialkyl-p-benzoquinones which may be prepared in accordance with the present invention include, for example, 2,6-dinitro-3,5-dihexyl-p-benzoquinone; 2,6-dinitro-3,5-diisopropyl-p-benzoquinone; 2,6-dinitro-3,5-dioctyl-p-benzoquinone; 2,5 - dinitro-3,6-dimethyl-p-benzoquinone; 2,5 - dinitro - 3,6-diheptyl-p-benzoquinone; 2,6-dinitro - 3,5-diethyl-p-benzoquinone; 2,6-dinitro-3,5-ditriacontyl-p-benzoquinone; 2,5-dinitro-3,6-didecyl-p-benzoquinone; 2,5 - dinitro - 3,6-dipentadecyl-p-benzoquinone; 2,5-dinitro-3,6-didodecyl-p-benzoquinone; 2,6-dinitro-3,5-didodecyl - p - benzoquinone; 2,6-dinitro-3-methyl-5-isopropyl - p-benzoquinone; 2,6-dinitro-3-heptyl-5-eicosyl-p-benzoquinone.

The novel dinitrobenzoquinones of the present invention may be reduced by appropriate means, such as by contacting with a reducing agent, for example, hydrogen, hydrogen sulfide, sulfur dioxide, and the like, to a further new class of organic compounds, hydroquinones of the structure

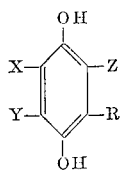

where R is alkyl; one of X and Y is alkyl, and the other is nitro, amino, or amino hydrohalide; and Z is nitro, amino, and amino hydrohalide wherein the halide may be chloride, bromide, iodide or fluoride, chloride being preferred. The alkyl is preferably of from 1 to about 20 carbon atoms. Typical alkyl groups are described hereinabove.

The hydroquinones of the present invention, characterized by the structural formula shown above, include dinitrodialkyl - p-hydroquinones, diaminodialkyl-p-hydroquinones and diaminodialkyl-p-hydroquinone dihydrohalide. The dinitrodialkyl hydroquinones of the present invention are useful as complexing agents for organic compounds such as ethers, and thus have utility for organic quantitative analysis. In addition, such compounds are useful as colorants, for example, in the dying of proteinaceous fibers. Similarly, the diaminodialkylhydroquinones and diaminodialkylhydroquinone dihydrohalides are useful as textile dyes, for example, in the coloring of proteinaceous materials such as hair or wool.

The dinitrodialkylhydroquinones of the present invention are prepared by the reduction of the corresponding quinone compound. The reduction may be accomplished by the action of a reducing agent, such as hydrogen gas, on the quinone, in the presence of a catalyst such as nickel. The reduction may be conveniently performed in a solvent such as methanol, ethanol, dioxane or the like. The resulting dinitrodialkylhydroquinone may then be further reduced to the corresponding diaminodialkylhydroquinone by reaction with a reducing agent such as hydrogen gas, in a solvent, such as ethanol, methanol, dioxane or the like, containing a small amount of a hydrogen halide such as HBr, HCl, HI or HF to produce the diaminodialkylhydroquinone dihydrohalide and neutralizing this product with a base to form the diamino-dialkylhydroquinone. Suitable bases include, for example, NaOH, KOH, $Na_2CO_3$, $NaHCO_3$ or the like, weaker bases such as $Na_2CO_3$ or $NaHCO_3$ being preferred. The hydroquinone is recovered from the solution by conventional procedures, such as extracting with diethyl ether and evaporating to dryness in an inert atmosphere. If desired, the diaminodialkylhydroquinone dihydrohalide may be removed prior to neutralization by similar procedures. The diaminodialkylhydroquinones are readily oxidizable and are advantageously prepared and stored in a non-oxidizing atmosphere such as nitrogen, carbon dioxide or the like. The corresponding dihydrohalides are more stable and may be conveniently handled in air. In practice it has been found expedient to prepare the diaminodialkylhydroquinone dihydrohalide and store the compound in this more stable form, converting by neutralization to the diaminodialkylhydroquinone prior to the use of the latter.

The following specific examples will serve to further illustrate the present invention. In the examples all parts are by weight and all temperatures are in degrees centigrade unless otherwise indicated.

PREPARATION

Example 1

2,6-dinitro-3,5-dimethyl-p-benzoquinone was prepared as follows: 25 parts of 93 percent sulfuric acid were added to 15 parts (0.061 mole) of 4-chloro-3,5-dimethylphenol over a period of 10 minutes. The mixture was heated to 75 to 85 degrees centigrade for 20 minutes. This mixture was added slowly with stirring over a period of 40 minutes to 36 parts of an aqueous solution of 23 percent by weight nitric acid. During the additions, the temperature was maintained between 25–30 degrees centigrade. At the end of the addition, the solution was heated to 100 degrees centigrade over a one hour period. The mixture was cooled to 30 degrees centigrade and poured into 1000 parts of ice water. The precipitated solid was removed by filtration, washed, and dried. The yield of crude material was 15 parts of a light yellow solid having a decomposition point of 183–185 degrees centigrade. This product, after recrystallization from acetone, gave a light yellow crystalline solid having a decomposition point of 183–185 degrees centigrade.

The infrared spectrum (Nujol mull) showed bands at 1560 and 1382 cm.$^{-1}$ (characteristic of $NO_2$), 1636 cm.$^{-1}$ (characteristic of c=c), and 1675 and 1689 cm.$^{-1}$ (characteristic of a split carbonyl). The nuclear magnetic resonance spectrum showed a single peak at 2.10 parts per million chemical shift relative to tetramethyl silane. The ultra-violet spectrum (taken in methanol) showed two absorption bands at $\lambda$ maximum=315 millimicrons and $\lambda$ maximum=250 millimicrons.

*Analysis.*—Calculated for $C_8H_6N_2O_6$ (percent): C, 42.48; H, 2.67; N, 12.39. Found (percent): C, 42.85; H, 2.91; N, 12.4.

The substitution of 4-bromo-3,5-dibutylphenol for the 4-chloro-3,5-dimethylphenol in the procedure of Example 1 results in the formation of 2,6-dinitro-3,5-dibutyl-p-benzoquinone.

Example 2

Preparation of 2,6 - dinitro - 3,5-dimethyl-p-benzoquinone: Fifteen parts of 3,5-dimethylphenol were added continuously to 150 parts of red fuming nitric acid (specific gravity 1.5) with stirring. The temperature during addition was maintained between 5 to 12 degrees centigrade. After the addition, the mixture was allowed to warm up to 25 degrees and after having stood overnight at this temperature, it was poured into 1000 parts of ice water. The resulting precipitate was vacuum filtered, washed with cold water and dried. A yield of 10 parts of crude 2,6-dinitro-3,5-dimethyl-p-benzoquinone product, having a decomposition point 180–185 degrees centigrade, was obtained. A portion was purified by recrystallization from acetone, and found to have a decomposition point of 185–190 degrees.

Example 3

Preparation of 2,6 - dinitro - 3,5 - diisopropyl-p-benzoquinone: Thirteen parts of 4-chloro-3,5-diisopropylphenol (0.0612 mole) was slowly added with stirring to a solution consisting of 11.8 parts of 70 percent nitric acid (specific gravity 1.42) and 100 parts of acetic acid. The temperature during addition was kept between 5 to 15 degrees centigrade, with the aid of an ice bath. The mixture was allowed to stand for two days at room temperature, after which the solution was poured into 1000 parts of ice water. After one hour, the precipitate was removed by filtration, washed with cold water, and dried. The crude 2,6-dinitro-3,5-diisopropyl-p-benzoquinone thus prepared was a yellow solid which was further purified by recrystallization from benzene and hexane to yield 7.5 parts of the pure material in the form of light yellow-orange plates having a melting point of 154–155 degrees centigrade.

Analysis.—Calculated for $C_{12}H_{14}N_2O_6$ (percent): N, 9.93. Found (percent): N, 9.76.

Following the general procedure of Example 3, when 4-sulfo-3-methyl-5-hexylphenol is substituted for the 4-chloro-3,5-diisopropylphenol, the product 2,6-dinitro-3-methyl-5-hexyl-p-benzoquinone is obtained.

Example 4

Preparation of 2,5 - dinitro - 3,6-dimethyl-p-benzoquinone: One hundred parts of 4-chloro-2,5-dimethylphenol was slowly added to 1570 parts of red fuming nitric acid (specific gravity 1.57). The reaction temperature was maintained between about 0 and 5 degrees centigrade, with the aid of an ice bath. After the addition the temperature was maintained at about 0 degree for about 25 minutes at the end of which time 55 parts of a white crystalline solid was removed by filtration. Five parts of this white crystalline solid was dissolved in 44 parts of benzene and the solution was heated to reflux for about 40 minutes. The solution was then stirred for about 1 hour at 25 degrees centigrade, dried over $MgSO_4$ and cooled to 10 degrees centigrade. After several hours, 0.4 part of 2,5-dinitro-3,6-dimethyl-p-benzoquinone, a yellow crystalline solid having a decomposition point of 213–215 degrees centigrade, precipitated and was removed by filtration. The infrered spectrum (Nujol mull) of the product showed bands at 1555 and 1380 cm.$^{-1}$ (characteristic of $NO_2$), 1642 cm.$^{-1}$ (characteristic of c=c), and 1678 cm.$^{-1}$ (characteristic of c=o). The nuclear magnetic resonance spectrum showed a single peak at 2.08 parts per million chemical shift relative to tetramethyl silane. The ultra-violet spectrum (in methanol) showed three absorption bands at λ maximum=340 millimicrons; λ maximum=312 millimicrons, and λ=250 millimicrons.

Analysis.—Calculated for $C_8H_6N_2O_6$ (percent): N, 12.39. Found (percent): N, 12.17.

Example 5

Preparation of 2,6-dinitro-3,5-dimethyl-p-hydroquinone: To a solution of 10 parts of 2,6-dinitro-3,5-dimethyl-p-benzoquinone in 200 parts of dioxane was added two parts of Raney nickel catalyst and the mixture was reacted with hydrogen gas at 60 pounds per square inch. The reaction was stopped after one molar equivalent of hydrogen was consumed. The catalyst was then removed and the dioxane was distilled off under reduced pressure. The residue was then recrystallized from an ethyl acetate-hexane mixture. The resulting 2,6-dinitro-3,5-dimethyl-p-hydroquinone is a light yellow crystalline solid having a melting point of 150–151 degrees centigrade.

Analysis.—Calculated for $C_8H_8N_2O_6$ (percent): N, 12.28. Found (percent): N, 11.89.

Example 6

Preparation of 2,6 - diamino - 3,5 - dimethylhydroquinone (dihydrochloride). Five parts of 2,6-dinitro-3,5-dimethylquinone was dissolved in 160 parts of anhydrous ethanol in which 1.8 parts of hydrogen chloride gas was dissolved. This was then reacted with hydrogen gas at 60 pounds per square inch, using 1 part of 5 percent platinum on carbon. After the required amount of hydrogen was consumed, the catalyst was filtered off and the filtrate concentrated to 75 milliliters. The resulting precipitate was dried, yielding 3 grams of 2,6-diamino-3,5-dimethylhydroquinone dihydrochloride, a light tan solid, which decomposed at 254 degrees centigrade.

Analysis.—Calculated for $C_8H_{14}Cl_2N_2O_2$ (percent): N, 11.62; Cl, 29.51. Found (percent): N, 10.88; Cl, 29.0.

Example 7

Preparation of 2,6-diamino-3,5-dimethylhydroquinone: One hundred parts of 2,6 diamino-3,5-dimethyl-p-hydroquinone dihydrochloride was dissolved in 15 parts of water. Dilute aqueous sodium bicarbonate was added until the pH reached 7 to obtain a neutral solution of 2,6-diamino-3,5 dimethylhydroquinone. The latter is recoverable from solution by extracting with diethyl ether, drying over $MgSO_4$ and evaporating to dryness in an inert atmosphere. The product, 2,6-diamino-3,5-dimethylhydroquinone is readily oxidizable and is preferably retained in an inert atmosphere, such as nitrogen or carbon dioxide or the like.

PESTICIDAL APPLICATION

Example 8

Nematocidal activity: Soil heavily infested with *Meloidogyne incognita* var. *acrita*, a plant pathogenic nematode species, was treated with 147 pounds per acre of 2,6 - dinitro - 3,5 - dimethyl-p-benzoquinone mixed thoroughly to 6 inches depth. In this soil, tomato seedlings were planted. One month later, the tomato plants were found to be healthy and their roots free of nematode-caused "root knots." By contrast, tomato plants grown is similarly infested but untreated soil were badly damaged by root knots caused by nematode attack.

Example 9

Insecticidal activity: Houseflies (*Musca domestica*) were sprayed with an aqueous dispersion containing 0.1 percent by weight of finely divided 2,6-dinitro-3,5 dimethyl-p-benzoquinone. Two hours later, 100 percent of the flies were prostrate. Twenty-four hours later, 100 percent of the flies were dead.

By contrast, no fly knockdown or kill was observed when houseflies were treated under similar conditions, with the closely related compound, 2-chloro-6-nitro-3,5-dimethyl-p-benzoquinone.

TEXTILE DYING APPLICATION

Example 10

Ten parts of 2,6-dinitro-3,5-dimethyl-p-hydroquinone and 22 parts of a 30 percent by weight aqueous solution of hydrogen peroxide were dissolved in 800 parts of acetone. A small piece of wool was treated by immersion in this solution for 24 hours at 25 degrees centigrade. A rust brown color, resistant to hot water, benzene and acetone, was imparted to the wool.

Example 11

A sample of wool was immersed in a solution of 10 parts of 2,6-dinitro-3,5-dimethyl-p-benzoquinone in 1200 parts of acetone, at 40 degrees centigrade, for about 10 minutes. The treatment imparted a mustard yellow color to the wool. The dyed wool was color-fast to warm water, benzene and acetone.

Example 12

Ten parts of 2,6-diamino-3,5-dimethyl-p-hydroquinone dihydrochloride and about 7 parts of nonyl-phenyl polyethylene glycol ether, a commercially available emulsifier and wetting agent, was dissolved in 1200 parts of water and the pH was adjusted to 7 with the addition of dilute aqueous solution of sodium bicarbonate. A sample of wool was suspended in the solution at room temperature (25 degrees centigrade) and the solution was oxidized by the addition of a solution of 10 parts of p-benzoquinone in 320 parts of acetone. After 20 minutes, the wool was washed with warm water and dried at room temperature. The treatment imparted a beige color to the wool. The dyed wool was color-fast to warm water, benzene and acetone.

In addition to the properties and uses described above, the hydroquinone compounds of the present invention have been found to be useful as pH indicators. For example, when a small amount of an alcoholic solution of 2,6-dinitro - 3,5 - dimethyl - p-hydroquinone is added to water, it imparts a brown color which changes to yellow at a pH between 3 and 4.

It will be apparent to those skilled in the art that many variations and modifications of the invention as hereinabove set forth may be made without departing from the spirit and scope of the invention. The invention is not to be construed as being limited to the examples given.

What is claimed is:

1. A compound selected from the group consisting of

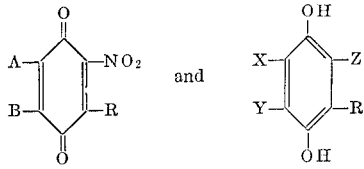

where:
R and B are alkyl;
X and A are nitro;
Y is selected from the group consisting of alkyl, amino and amino hydrohalide; and
Z is selected from the group consisting of nitro, amino and amino hydrohalide.

2. A compound of the formula

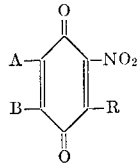

where:
R and B are alkyl; and
A is nitro.

3. A compound according to claim 1 of the formula

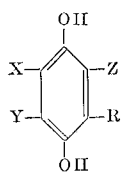

where:
R is alkyl;
X is nitro;
Y is selected from the group consisting of alkyl, amino and amino hydrohalides; and
Z is selected from the group consisting of nitro, amino and amino hydrohalide.

4. The compound of claim 2, wherein A is nitro and R and B are methyl.

5. The compound of claim 2, wherein A is nitro and R and B are isopropyl.

6. The compound of claim 3, wherein Z and X are nitro and R and Y are methyl.

7. 2,6 - diamino - 3,5-dimethyl-p-hydroquinone(hydrochloride).

8. A method for the preparation of dinitrodialkyl-p-benzoquinone which comprises contacting with a nitrating agent, a compound of the formula:

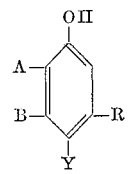

wherein:
(a) R is alkyl; one of A and B is alkyl and the other is hydrogen; and Y is selected from the group consisting of hydrogen, halogen, nitro, and sulfo; and
(b) at least about 3 moles of nitrating agent is used per mole of the aforementioned compound; and
(c) the reaction is conducted at a temperature of from about −20 degrees centigrade to about the reflux temperature of the nitrating agent for a period of time of from about 5 minutes to about 24 hours.

9. A method which comprises:
(1) reacting with a nitrating agent a compound of the formula

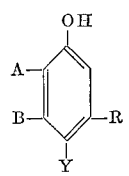

wherein:
(a) R is alkyl; one of A and B is alkyl and the other is hydrogen; and Y is selected from the group consisting of hydrogen, halogen, nitro, and sulfo; and
(b) at least about 3 moles of nitrating agent is used per mole of the aforementioned compound; and
(c) the reaction is conducted at a temperature of from about −20 degrees centigrade to about the reflux temperature of the nitrating agent for a period of time of from about 5 minutes to about 24 hours; and
(2) contacting the resulting dinitrodialkyl-p-benzoquinone with a reducing agent.

10. A method according to claim 9 wherein said dinitrodialkyl-p-benzoquinone is further contacted with a reducing agent in the presence of a hydrogen halide to form diaminodialkylhydroquinone dihydrohalide.

11. A method according to claim 10 wherein said diaminodialkylhydroquinone dihydrohalide is further contacted with a neutralizing amount of a base to form diaminodialkylhydroquinone.

(References on following page)

References Cited

UNITED STATES PATENTS
2,222,486  11/1940  Moore _____ 260—622

FOREIGN PATENTS
1,204,238  11/1965  Germany _____ 260—396

LORRAINE A. WEINBERGER, Primary Examiner

L. A. THAXTON, Assistant Examiner

U.S. Cl. X.R.

8—10, 54; 260—575, 622, 999